United States Patent [19]

Alpers

[11] 3,712,563
[45] Jan. 23, 1973

[54] AUTOMATIC PATH FOLLOWER GUIDANCE SYSTEM

[75] Inventor: Frederick C. Alpers, Riverside, Calif.

[73] Assignee: The United States of America as represented by the Secretary of the Navy

[22] Filed: Dec. 4, 1963

[21] Appl. No.: 328,129

[52] U.S. Cl. ................................................244/3.17
[51] Int. Cl. ..............................................F42b 15/02
[58] Field of Search......343/5 MM, 7, 100.7; 244/14; 73/178; 88/1, 14

[56] References Cited

UNITED STATES PATENTS

| 2,884,540 | 4/1959 | Schockley | 244/14 |
| 3,041,011 | 6/1962 | Dhanes | 244/14 |
| 3,103,008 | 9/1963 | Mooney | 343/5 MM |
| 3,113,306 | 12/1963 | Gardner | 343/5 MM |

*Primary Examiner*—Verlin R. Pendegrass
*Attorney*—Q. Baxter Warner, J. M. St. Amand and T. M. Phillips

EXEMPLARY CLAIM

In an airborne vehicle automatic path follower guidance system, the combination comprising:

a. optical scanning means located in the airborne vehicle for scanning a landscape below said vehicle at a predetermined repetition rate,
b. optical information storage means for storing information peculiar to the terrain of the path over which the vehicle is intended to fly,
c. first, second, and third null detectors,
d. each of said null detectors having a first input coupled to said optical scanning means,
e. said first null detector having a second input coupled directly to said information storage means,
f. said second null detector having a second input coupled to said information storage means through a first delay circuit having a time delay equal one scan of said optical scanning means,
g. said third null detector having a second input coupled to said information storage means through a second delay circuit having a time delay twice that of said first time delay,
h. a first comparator circuit having a first input coupled to the output of said first null detector and a second input coupled to the output of said second null detector for producing a corrective signal when said vehicle moves to the left of said flight path,
i. a second comparator circuit having a first input coupled to the output of said second null detector and a second input coupled to the output of said third null detector for producing a corrective signal when said vehicle moves to the right of said flight path.

7 Claims, 3 Drawing Figures

FREDERICK C. ALPERS
INVENTOR.

FREDERICK C. ALPERS
INVENTOR

AUTOMATIC PATH FOLLOWER GUIDANCE SYSTEM

The invention herein described may be manufactured and used by or for the Government of the United States of America for governmental purposes without the payment of any royalties thereon or therefor.

The present invention relates to automatic path follower guidance systems and more particularly to automatic path follower guidance systems of the type where comparison is made between a viewed terrain and reference information stored on a tape or film.

The present invention provides a system which obtains optical information by scanning the landscape below a moving aircraft or missile, correlates this information against information stored on a tape or film, and processes the correlation outputs in special ways so as to obtain signals for correcting both the aircraft or missile flight path and the speed of the storage tape or film mechanism to keep the position of the aircraft or missile aligned with the position information stored on the tape or film.

An object of the present invention is to provide an improved automatic path follower guidance system.

Another object of the invention is to provide an improved automatic path follower guidance system which provides optical map matching type of guidance but is simpler and requires less space and weight than other known systems of this type.

Other objects and many of the attendant advantages of this invention will become readily appreciated as the same becomes better understood by reference to the following detailed description when considered in connection with the accompanying drawings wherein.

Figure 1:
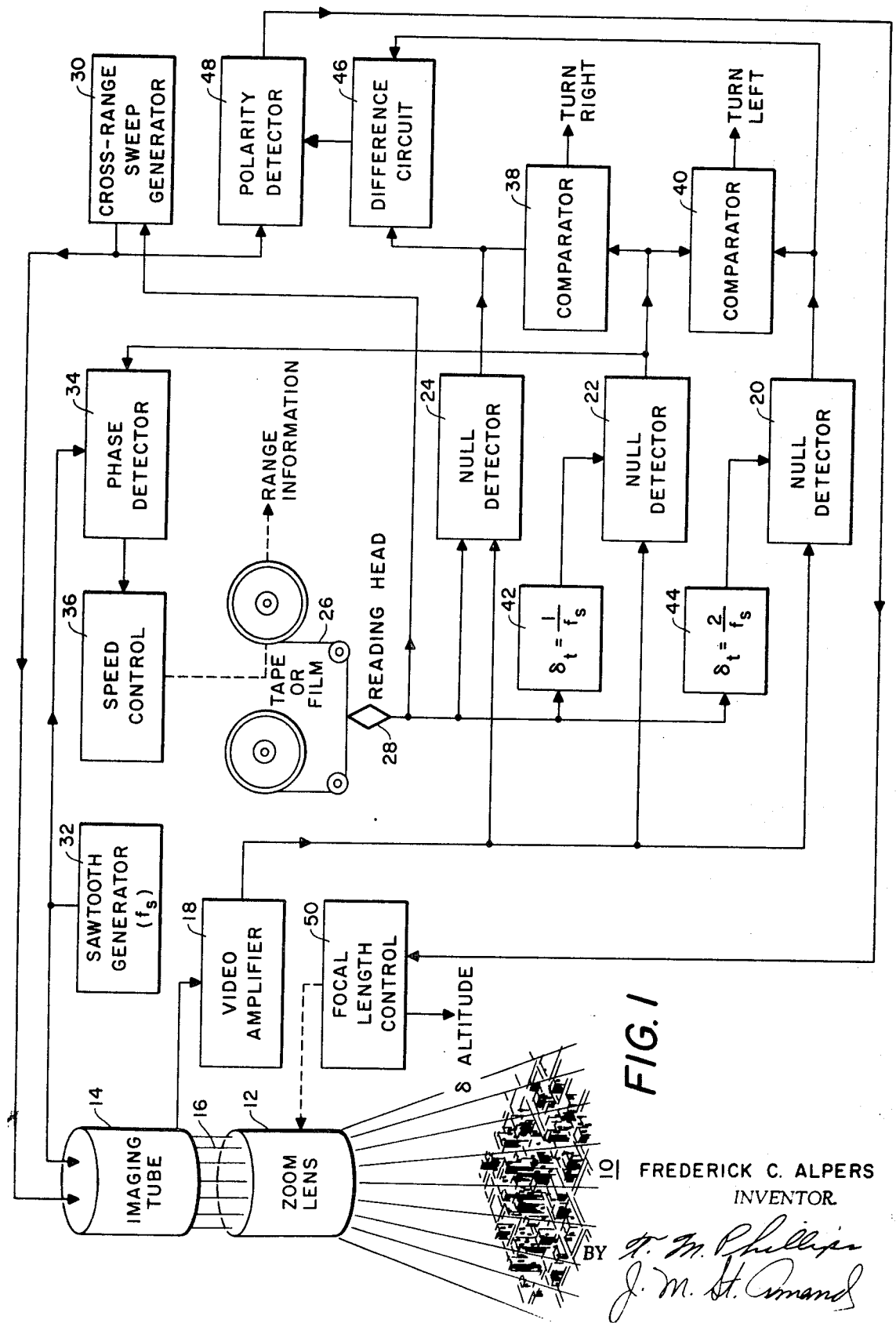
FIG. 1 is a block diagram of a preferred embodiment.

Referring now to the drawings there is shown a zoom lens 12 for focusing the image of terrain 10 on the face of imaging tube 14. The video output signal from imaging tube 14 is amplified in video amplifier 18 and fed into null detectors 20, 22 and 24. At the same time a video signal is fed from tape or film 26 by means or reading head 28 as a second input to null detectors 20, 22 and 24.

A cross-range sweep generator 30 supplies a scanning signal to tube 14 to cause the beam of imaging tube to sweep across the image in a direction orthogonal to the direction of motion of the vehicle to be guided. This has the effect of having a scanning optical beam traveling across the ground and sweeping from the left side of the vehicle to directly below and then on toward the right side while the vehicle travels forward in range. This is termed "cross-range" scanning. The signal for sweeping in the other direction (parallel to the direction of motion, or "down range") is supplied from sawtooth generator 32 which runs at a frequency $f_s$. The sweep provided by generator 32 should be shorter than the long sweep of cross-range sweep generator 30, but its frequency should be considerably higher.

Figure 2:
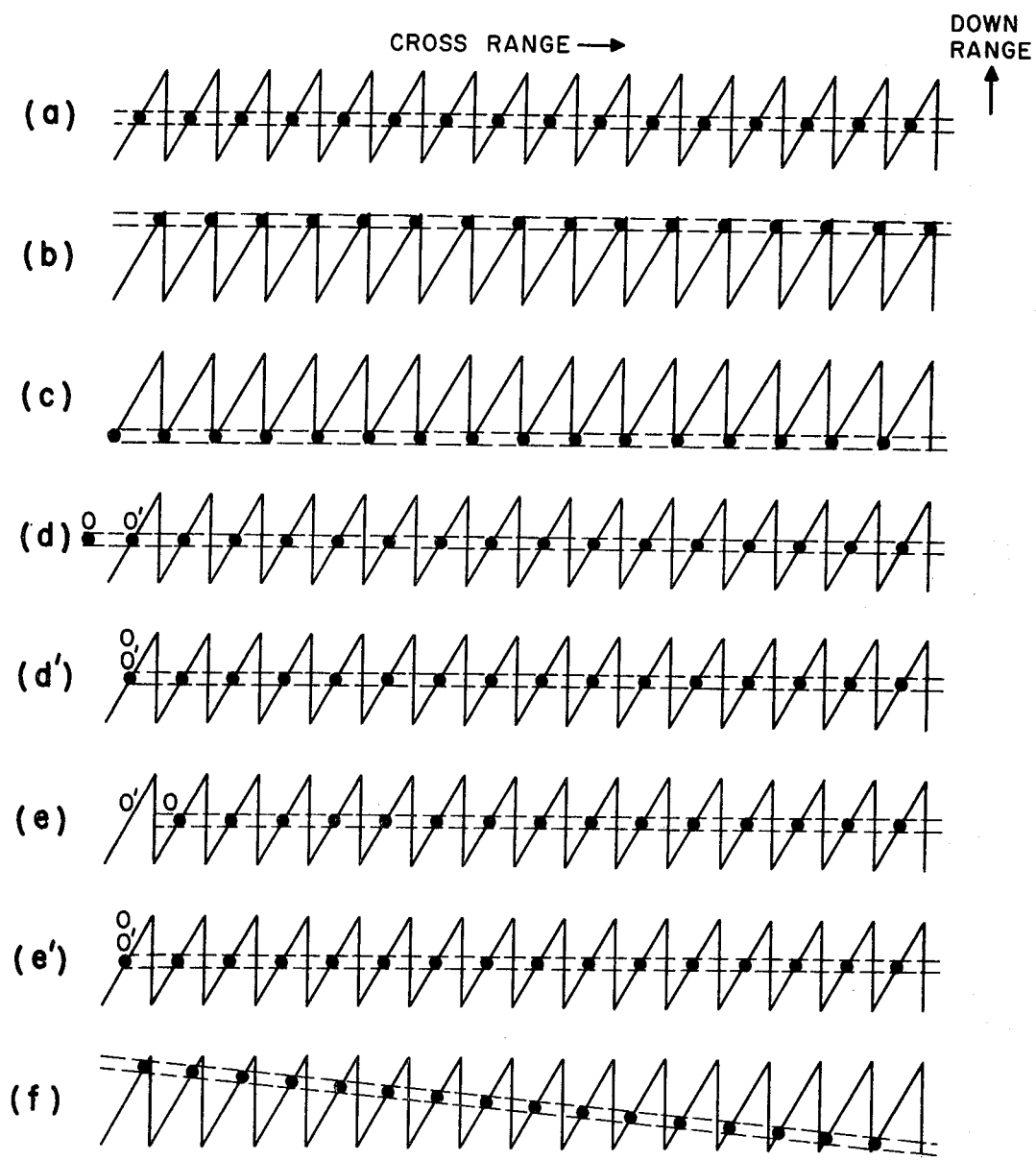
FIGS. 2 and 3 are graphs used in understanding the theory of operation of the invention.

In order to match the video signals coming from imaging tube 14 against the information that comes from the tape or film 26 and control the tape or film speed so that the stored information corresponds properly to the video signals at the center points of the sawtooth down-range sweeps, a tracking network is provided consisting of null detector 22, phase detector 34 and speed control 36. The action that keeps the information on the tape 26 coincident with the center points of the down-range scan of imaging tube 14 is that null detector 24 compares the two video signals to determine if they are in coincidence and phase detector compares the signal from null detector 22 and the sweep signal from sawtooth generator 32 to determine if the signal outputs from null detector 22 occur at the start of the sawtooth sweep, near the end of the sweep, or directly in the middle as desired. This may be understood by reference to waveform (a) in FIG. 2. Here the output signal from detector 22, symbolized by the series of black dots, is one indication that there are coincidences between the two video input signals to detector 22; and with reference to the sawtooth waveform from generator 32 it is seen that the null detector coincidences are occurring at the middle of the sawtooth sweeps (i.e., the tape speed is accurately matched to the speed of the vehicle and in each instance the coincidence comes in the middle of the down-range sweep). In waveform (b) of FIG. 2 the black dots indicative of best correlation within the null detector occur at the tops of the sawtooth sweeps, which means that coincidences occur when the optical scanning is positioned down range, or ahead of the vehicle. This indicates that the vehicle is falling in speed behind the speed of tape 26. In corresponding manner, in waveform (c) the dots showing coincidence occur at the bottoms of the sawtooths and indicate that the vehicle is moving at a speed greater than the speed of tape 26. When either the (b) or (c) situation occurs, a corresponding corrective signal will be fed to speed control 36 to either speed up or slow down tape 26.

To maintain the vehicle on course in the cross range direction control signals are generated by comparators 38 and 40. Time delay circuits 42 and 44 are used to delay the stored signals fed to null detectors 22 and 20 respectively. The time delay of time delay circuit 42 is $1/f_s$, i.e., the signal arriving at null detector 22 from tape 26 is delayed by an amount equal to the period of the sawtooth signal generated by generator 32. The time delay of time delay circuit 44 is $2/f_s$ or twice the period of the sawtooth signal. Time delay may also be obtained by using separate reading heads appropriately spaced along the tape 26 to give the required time delay.

The outputs of null detectors 22 and 24 are fed into comparator 38 where a comparison is made of (1) the extent of coincidence of the information stored on tape with the sequence of information coming from video amplifier 18 when both are undelayed and (2) the extent of coincidence when the stored signal is delayed with respect to the undelayed signal from amplifier 18. In other words, a check is made of the signals coming from video amplifier 18 to see if they correlate properly with the undelayed stored signals, or if they correlate only when the one is more or less delayed and thus offset in a cross-range sense with respect to the other. The outputs of comparators 38 and 40 then indicate whether the two signals correlate properly without offset or whether an offset to either the right or left of the actual position in space is necessary for best match in null detector 22. As represented in waveforms (d) and (d') in FIG. 2, the signal from tape 26 arrives at null detector 22 before the corresponding signal from video amplifier 18, which is the case when the vehicle drifted to the right of the intended position at that time. In this situation a suitable match is obtained when the tape signal is delayed by one additional down-range sweep period so that point "O" is superimposed on "O'". Since this is what occurs in null detector 20 with a delay $2/fs$, an output will occur here and comparator 40 will sense that the vehicle is displaced to the right of the intended position, and the output signal from comparator 40 is utilized as a left turn signal. Similarly waveform (e) and (e') illustrate what happens when the vehicle is displaced to the left, and a right turn signal is generated by comparator 38. Thus, a right-left or cross-range tracking action corresponding in a general sense to the down-range tracking is achieved. The cross-range tracking depends on correlation of stored video information with imaging tube video information at any point in each down-range sweep rather than at some particular point as in the case with the down-range tracking. The right and left turn signals can be supplied directly to the vehicle control system to cause displacement of the vehicle back toward the intended path, or can be used to point imaging tube 14 and lens 12 to the right or left with vehicular corrections following as a consequence of continued tube and lens offset.

Figure 3:
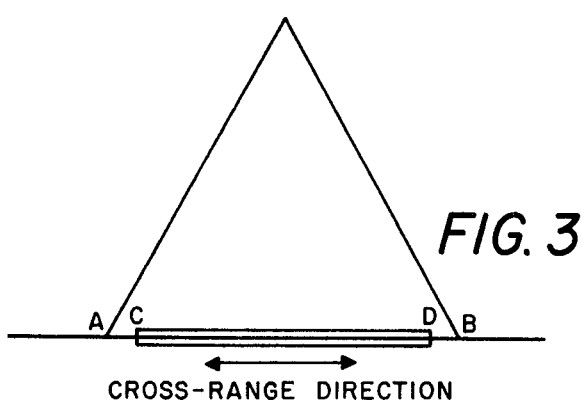

In the above description it was assumed that the length of video signal from film 26 was equal in time to the length of the signal from imaging tube 14 for each complete scan or raster. This is only true when the altitude of the vehicle is such that the angle coverage of information on tape 26 is the same as the angle coverage of the raster of imaging tube 14. In order to maintain equal angle of coverage, a tracking loop in altitude is provided which includes difference circuit 46, polarity detector 48 and focal length control 50. If the length of the two video signals fed into null detectors 20 and 24 are not equal in length, the correlation appearing in each of the outputs will vary during the course of a cross range sweep. This is shown in FIG. 3 where the actual terrain scanned by imaging tube 14 is represented by the line A–B, and the terrain record stored on tape 26 by the line C–D. For purposes of explanation the assumption is made that the portion of terrain represented by the video signal desired from the tape does not cover the same length as the portion being scanned through the imaging tube action, but rather is shorter by the amount A–C plus D–B. Now the centering action involving turn right and turn left commands which were described above will assure that line C–D is centered on line A–B; i.e., the distances A–C and D–B are equal. When the effect of the outputs from null detectors 20 and 24 are considered, note that at the A–C end of these lines there is a correlation situation such as shown in the left portion of waveform (e'), FIG. 2, where coincidences occur in null detector 24. At the B–D end of the cross-range sweep, the signal stored on tape 26 is actually displaced in time so that in other than null detector 20 it comes later than the video signal from imaging tube 14, if we assume, as heretofore, that the sweep is from "A" toward "B". With this situation there will be a region of proper correlation in null detector 24 during the first half of the cross-range sweep and an output will appear at null detector 20 in the second half of the cross-range sweep.

The outputs of null detectors 20 and 24 are connected as inputs to difference circuit 46. Difference circuit 46 subtracts the two inputs and obtains a positive polarity signal when null detector 24 predominates, as occurs during the first half of the sweep, and obtains the reverse polarity when null detector 20 predominates, as happens during the second half sweep. The output of difference circuit 46 is fed into polarity detector 48, where the output from cross-range sweep generator 30 is connected as a second input and used as a standard of comparison. If the polarity change in the output of difference circuit 46 corresponds to the direction of polarity change in the sawtooth waveform of the cross-range sweep circuit, the polarity detector gives an output which changes the focal length control in one direction, whereas if the null detector outputs occurred in reverse sequence, as would be the case if the points C and D extended beyond or to the outside of A and B, the situation would be such that the output of difference circuit 46 would have an opposite polarity to the waveform from the cross range sweep generator, and this would cause the focal length control to vary in the other direction. Thus, the angle of view is corrected so that the lengths of the terrain signal stored (C–D) and that scanned (A–B) are kept equal. Moreover, coming out of the focal length control we have a change of altitude signal which tells us that the altitude that we are actually flying in the aircraft or missile is different than the altitude programmed into tape 26, and altitude tracking is accomplished in the same way that we are tracking in the down range and cross range directions. Thus, three dimensional tracking is accomplished and correction can be made along all three coordinates and cause the vehicle to fly along a certain line in space.

In operation the pilot or operator in initiating the action of the system synchronizes the signals received from tape 26 and tube 14 so that the landscape below the imaging tube matches the stored signal in a down-range direction. He also maneuvers the missile or aircraft or adjusts the reading head 28 position so that the signals are similarly matched in a cross-range direction and adjusts the zoom lens to the right angular coverage. After the pilot initiates tracking in a down-range direction, in a cross-range direction, and in an altitude sense, the missile or aircraft will automatically be navigated by means of the path follower action which keeps tracking in all three directions.

So far it has been assumed that the vehicle continues in the same general direction so that there is no occasion for rotation of imaging tube trace with respect to that recorded on the tape. If there is a significant yawing motion to give rise to such rotation, the situation as shown in waveform (f) of FIG. 2 arises. In this case proper correlation only occurs when the video from tape 26 is tipped with respect to the actual video coming from the imaging tube. The consequence is to have coincidences at the tops of the sawtooth sweeps for part of the cross-range sweep and at the bottom of the sawtooths for the opposite part of the cross-range sweep. By re-consideration of what was done in the differencing circuit and polarity detector to develop an angular coverage correction, it should be clear that the same sort of correction can be developed to rotate the imaging tube or to cock the cross-range sweep at an angle until the imaging tube raster runs parallel to the terrain sweep stored on the tape. A second polarity detector (not shown) could be coupled to operate from the output of phase detector 34 so as to detect the situation in which coincidences occur at the top part of the sawtooths for one part of the cross-range sweep and at the bottom of the sawtooths for the other part, and would develop an output to control the rotation of the imaging tube about the vertical axis to restore proper alignment between the stored information and the actual information being traced out on the imaging tube. Thus the action here is that of sensing either a yaw motion of the vehicle away from a straight line course called for by the tape or film, or the failure of the missile to comply with a turn called for by the tape. In either case a correction can be generated to yaw the missile so that the two are brought into coincidence. A controlled turn can result. If the missile turns too sharply, a correction would be made in one direction, and if the missile does not turn sharply enough a correction would be made in the other direction. Also, this yaw control can be made to correct for a sidewind by cocking the nose of the vehicle to the proper side to keep the actual direction of flight coincident with the planned direction.

The system can be modified for operation in bad weather of fog by replacing the lens and imaging tube with a microwave radiometer type device. With this arrangement radiometric signals at microwave frequencies resulting both from thermal radiations and from reflections would be received by scanning the terrain below the vehicle with a highly directive beam. Radiometric signals would be received and correlated much the same as the optical signals are received but with the difference that the sawtooth generator would be obviated by using a row of antenna elements for simultaneous detection rather than a scanning action, and the phase detection would be replaced by a device which sensed in which of these different receiving elements the best correlation with the tape signal occurred.

The system may also be modified for actually aiming a missile at a target at the end of flight. If the path follower device described above was used to guide the missile along a midcourse flight path until it almost reached a target, a sloping mirror could be switched into place below the lens which would have the effect of deriving the imaging tube signal from the terrain in front of the missile rather than vertically down from the missile. This would then supply a new set of video information which could be matched against another tape or a later portion of the same tape; i.e., the direction of look of the imaging tube and the tape or film would be switched coincidentally. The tape would then give video signals corresponding to progressively closer pictures as the missile approached the target.

In the above description it was assumed that coincidence or non-coincidence between the information on tape 26 and the information from imaging tube 14 applied for every point involved. In actual practice large objects present in the terrain may cause essentially uniform signals over a significant portion of a down range or cross range scan and the scene may have changed since the tape was made. Because the information supplied to the guidance system is averaged over a large number of elements and scans, the overall effectiveness of the control system is not affected by the individual discrepancies.

Obviously many modifications and variations of the present invention are possible in the light of the above teachings. It is therefore to be understood that within the scope of the appended claims the invention may be practiced otherwise than as specifically described.

What is claimed is:

1. In an airborne vehicle automatic path follower guidance system, the combination comprising:
   a. optical scanning means located in the airborne vehicle for scanning a landscape below said vehicle at a predetermined repetition rate,
   b. optical information storage means for storing information peculiar to the terrain of the path over which the vehicle is intended to fly,
   c. first, second, and third null detectors,
   d. each of said null detectors having a first input coupled to said optical scanning means,
   e. said first null detector having a second input coupled directly to said information storage means,
   f. said second null detector having a second input coupled to said information storage means through a first delay circuit having a time delay equal one scan of said optical scanning means,
   g. said third null detector having a second input coupled to said information storage means through a second delay circuit having a time delay twice that of said first time delay,
   h. a first comparator circuit having a first input coupled to the output of said first null detector and a second input coupled to the output of said second null detector for producing a corrective signal when said vehicle moves to the left of said flight path,
   i. A second comparator circuit having a first input coupled to the output of said second null detector and a second input coupled to the output of said third null detector for producing a corrective signal when said vehicle moves to the right of said flight path.

2. In an airborne vehicle automatic path follower guidance system, the combination comprising:
   a. a television camera located in the airborne vehicle for scanning a landscape below said vehicle at a predetermined repetition rate,
   b. optical information storage means for storing information peculiar to the terrain of the path over which the vehicle is intended to fly,
   c. first, second, and third null detectors,
   d. each of said null detectors having a first input coupled to said television camera,
   e. said first null detector having a second input coupled directly to said information storage means,
   f. said second null detector having a second input coupled to said information storage means through a first delay circuit having a time delay equal one scan of said television camera,
   g. said third null detector having a second input coupled to said information storage means through a second delay circuit having a time delay twice that of said first time delay,
   h. a first comparator circuit having a first input coupled to the output of said first null detector and a second input coupled to the output of said second null detector for producing a corrective signal when said vehicle moves to the left of said flight path, i. a second comparator circuit having a first input coupled to the output of said second null detector and a second input coupled to the output of said third null detector for producing a corrective signal when said vehicle moves to the right of said flight path.

3. In an airborne vehicle automatic path follower guidance system, the combination comprising:

a. a television camera located in the airborne vehicle for scanning a landscape below said vehicle at a predetermined repetition rate,
b. magnetic tape storage means for storing information peculiar to the terrain of the path over which the vehicle is intended to fly,
c. first, second, and third null detectors,
d. each of said null detectors having a first input coupled to said television camera,
e. said first null detector having a second input coupled directly to said information storage means,
f. said second null detector having a second input coupled to said information storage means through a first delay circuit having a time delay equal one scan of said television camera,
g. said third null detector having a second input coupled to said information storage means through a second delay circuit having a time delay twice that of said first time delay,
h. a first comparator circuit having a first input coupled to the output of said first null detector and a second input coupled to the output of said second null detector for producing a corrective signal when said vehicle moves to the left of said flight path,
i. a second comparator circuit having a first input coupled to the output of said second null detector and a second input coupled to the output of said third null detector for producing a corrective signal when said vehicle moves to the right of said flight path.

4. In an airborne vehicle automatic path follower guidance system, the combination comprising:

a. a television camera located in the airborne vehicle for scanning a landscape below said vehicle at a predetermined repetition rate,
b. magnetic tape storage means for storing information peculiar to the terrain of the path over which the vehicle is intended to fly,
c. first, second, and third null detectors,
d. each of said null detectors having a first input coupled to said television camera,
e. said first null detector having a second input coupled directly to said information storage means,
f. said second null detector having a second input coupled to said information storage means through a first delay circuit having a time delay equal one scan of said television camera,
g. said third null detector having a second input coupled to said information storage means through a second delay circuit having a time delay twice that of said first time delay,
h. a first comparator circuit having a first input coupled to the output of said first null detector and a second input coupled to the output of said second null detector for producing a corrective signal when said vehicle moves to the left of said flight path,
i. a second comparator circuit having a first input coupled to the output of said second null detector and a second input coupled to the output of said third null detector for producing a corrective signal when said vehicle moves to the right of said flight path,
j. and means coupled to said first and third null detectors for producing altitude correcting signals.

5. In an airborne vehicle automatic path follower guidance system, the combination comprising:

a. a television camera located in the airborne vehicle for scanning a landscape below said vehicle at a predetermined repetition rate,
b. magnetic tape storage means for storing information peculiar to the terrain of the path over which the vehicle is intended to fly,
c. first, second, and third null detectors,
d. each of said null detectors having a first input coupled to said television camera,
e. said first null detector having a second input coupled directly to said information storage means,
f. said second null detector having a second input coupled to said information storage means through a first delay circuit having a time delay equal one scan of said television camera,
g. said third null detector having a second input coupled to said information storage means through a second delay circuit having a time delay twice that of said first time delay,
h. a first comparator circuit having a first input coupled to the output of said first null detector and a second input coupled to the output of said second null detector for producing a corrective signal when said vehicle moves to the left of said flight path,
i. a second comparator circuit having a first input coupled to the output of said second null detector and a second input coupled to the output of said third null detector for producing a corrective signal when said vehicle moves to the right of said flight path,
j. a difference circuit having a first input coupled to the output of said first null detector and a second input coupled to the output of said third null detector and producing a positive output signal when the output of said first null detector is greater than the output signal from said third null detector and a negative output signal when the output signal from said third null detector is greater than the output signal from said first null detector,
k. polarity detecting means coupled to the output of said difference circuit for comparing the output of said difference circuit with the cross-range sweep generator voltage for producing a corrective signal to the focal length control of said television camera.

6. In an airborne vehicle automatic path follower guidance system, the combination comprising:

a. a television camera located in the airborne vehicle for scanning a landscape below said vehicle at a predetermined repetition rate, b. magnetic tape storage means for storing information peculiar to the terrain of the path over which the vehicle is intended to fly,
c. first, second, and third null detectors,
d. each of said null detectors having a first input coupled to said television camera,
e. said first null detector having a second input coupled directly to said information storage means,
f. said second null detector having a second input coupled to said information storage means through a first delay circuit having a time delay equal one scan of said television camera,
g. said third null detector having a second input coupled to said information storage means through a second delay circuit having a time delay twice that of said first time delay,
h. a first comparator circuit having a first input coupled to the output of said first null detector and a second input coupled to the output of said second null detector for producing a corrective signal when said vehicle moves to the left of said flight path,
i. a second comparator circuit having a first input coupled to the output of said second null detector and a second input coupled to the output of said third null detector for producing a corrective signal when said vehicle moves to the right of said flight path,
j. and means coupled to the output of said second null detector for maintaining the stored information in synchronism with the information received from said television camera.

7. In an airborne vehicle automatic path follower guidance system, the combination comprising:
   a. a television camera located in the airborne vehicle for scanning a landscape below said vehicle at a predetermined repetition rate,
   b. magnetic tape storage means for storing information peculiar to the terrain of the path over which the vehicle is intended to fly,
   c. first, second, and third null detectors,
   d. each of said null detectors having a first input coupled to said television camera,
   e. said first null detector having a second input coupled directly to said information storage means,
   f. said second null detector having a second input coupled to said information storage means through a first delay circuit having a time delay equal one scan of said television camera,
   g. said third null detector having a second input coupled to said information storage means through a second delay circuit having a time delay twice that of said first time delay,
   h. a first comparator circuit having a first input coupled to the output of said first null detector and a second input coupled to the output of said second null detector for producing a corrective signal when said vehicle moves to the left of said flight path,
   i. a second comparator circuit having a first input coupled to the output of said second null detector and a second input coupled to the output of said third null detector for producing a corrective signal when said vehicle moves to the right of said flight path,
   j. a sawtooth wave generator,
   k. a phase detector having a first input coupled to the output of said second null detector and a second input coupled to said sawtooth wave generator for generating a corrective signal in response to a difference in phase between the occurrence of the sawtooth wave and the occurrence of an output signal from said second null detector to maintain the stored information in synchronism with the information received from said television camera.

* * * * *